US012207360B1

(12) United States Patent
Liu et al.

(10) Patent No.: US 12,207,360 B1
(45) Date of Patent: Jan. 21, 2025

(54) DUAL SOURCE CONTROL OF A SINGLE PACKAGED TERMINAL UNIT

(71) Applicant: Ice Air, LLC, Mount Vernon, NY (US)

(72) Inventors: Yi Liu, Haworth, NJ (US); Anthony Gili, Wilton, CT (US); Fredric Nadel, Westport, CT (US)

(73) Assignee: Ice Air, LLC, Mount Vernon, NY (US)

(*) Notice: Subject to any disclaimer, the term of this patent is extended or adjusted under 35 U.S.C. 154(b) by 0 days.

(21) Appl. No.: 18/781,239

(22) Filed: Jul. 23, 2024

(51) Int. Cl.
*H05B 1/02* (2006.01)
*H01H 9/54* (2006.01)

(52) U.S. Cl.
CPC ............. *H05B 1/0202* (2013.01); *H01H 9/54* (2013.01)

(58) Field of Classification Search
CPC ................................ H05B 1/0202; H01H 9/54
See application file for complete search history.

(56) References Cited

U.S. PATENT DOCUMENTS 6,639,330 B2 * 10/2003 Villarin ................ H01H 47/001 307/64
8,004,115 B2 * 8/2011 Chapel ................. H01R 25/003 307/64

* cited by examiner

*Primary Examiner* — Carlos Amaya
(74) *Attorney, Agent, or Firm* — Blank Rome LLP

(57) ABSTRACT

A method and system of controlling a single load by one of two available power sources. More particularly, the wiring and use of a relay to control a power feed to a packaged terminal unit, that provides both heating and cooling to an individual housing unit, from one of two power sources based upon a heating or cooling thermostat mode of operation. The relay is wired and configured so that when the thermostat is in one mode of operation, a primary side of the relay is open, or not complete, the normally-closed contacts are energized, and the packaged terminal unit is powered by one of the first and the second power source; and when the thermostat is in a second mode of operation, the primary side of the relay is triggered, the normally-open contacts are energized, and the packaged terminal unit ingle is powered by the other power source.

10 Claims, 2 Drawing Sheets

DUAL SOURCE CONTROL OF A SINGLE PACKAGED TERMINAL UNIT

FIELD OF THE INVENTION

Figure 1:
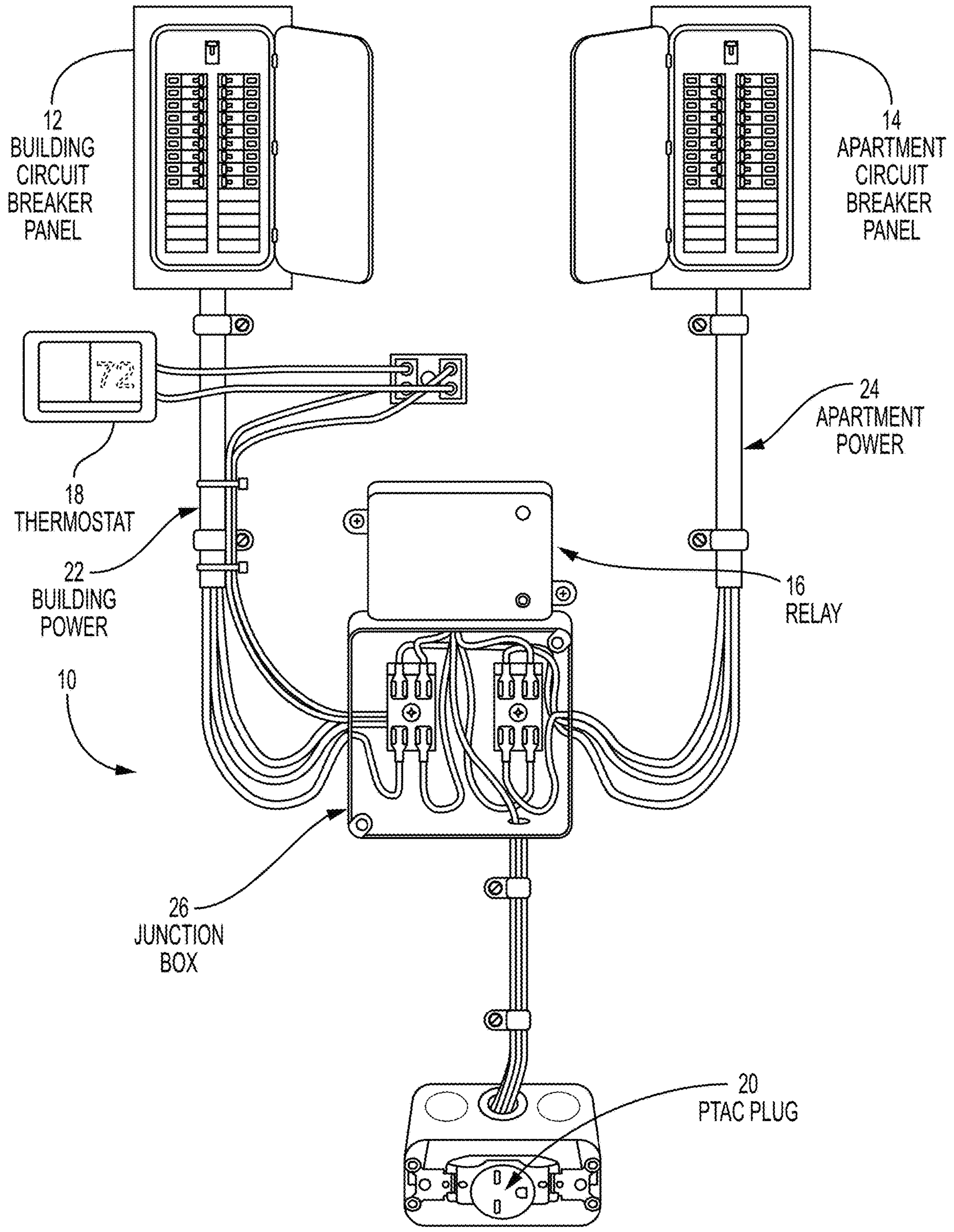

The present invention relates generally to a method of controlling a single load by one of two available power sources; and more particularly to a method of wiring and using a relay to control a power feed to a packaged terminal unit that provides both heating and cooling to an individual housing unit from one of two power sources based upon a heating or cooling thermostat mode of operation.

BACKGROUND OF THE INVENTION

In certain circumstances, controlling a power source to a packaged terminal unit that provides both heating and cooling is desired (e.g., a PTAC-packaged terminal air conditioner; or a PTHP-packaged terminal heat pump), where a selection of the power source depends upon whether the packaged terminal unit is in a heating or cooling operating mode. For example, in certain housing applications, where multiple housing units exist in an overall facility arrangement, heat to each housing unit may be provided by the overall facility, but cooling (air conditioning) may be the responsibility of the individual unit occupant.

In these housing applications, it is desirable to immediately provide either heating or cooling to each housing unit, while having a method to delineate responsibility for heating to the overall facility and for cooling to the individual unit applicant (thereby splitting costs appropriately). One efficient means to provide this method is to have a single packaged terminal unit (e.g., a PTAC or PTHP) assigned to each housing unit, providing both heating and cooling to the housing unit; but to have the single packaged terminal unit (e.g., a PTAC or PTHP), when in heating mode, be powered by a panel of the overall facility, and when in cooling mode, be powered by a panel of the individual housing unit (or apartment/condo).

Accordingly, what is needed is a method of wiring each individual housing unit so that a single packaged terminal unit (e.g., a PTAC or PTHP) in that unit, providing both heating and cooling to the unit, is powered by the overall facility power source when in heating mode, and by the individual unit power source when in cooling mode, where a thermostat setting of heating or cooling mode triggers a switching between the overall facility power source and the individual unit power source.

SUMMARY OF THE INVENTION

The present disclosure provides a method of (and system for) wiring each individual housing unit so that a single packaged terminal unit (e.g., a PTAC-packaged terminal air conditioner; or a PTHP-packaged terminal heat pump), providing both heating and cooling to the housing unit, is powered by an overall facility power source when in heating mode, and by an individual housing unit power source when in cooling mode, where a thermostat setting of heating or cooling mode triggers a switching between the overall facility power source and the individual unit power source.

The method provides an efficient method of splitting an electrical cost of heating and cooling, when each is provided by a single packaged terminal unit. In one aspect, a readily available relay is wired so that two power sources can be separately selected to power the single packaged terminal unit depending on whether the thermostat calls for a heating or cooling mode of operation.

In certain embodiments, methods of wiring a relay to control whether one load is powered from one or the other of two power sources is disclosed. In other embodiments, methods of operating a single load powered from (and switching between) one of two power sources is disclosed. These methods can involve connecting two lines of a first power source to either normally-closed or normally-open contacts of a secondary side of a relay; connecting two lines of a second power source to the other of the normally-closed or the normally-open contacts of the secondary side of the relay; and connecting two lines of the one load to common contacts of the secondary side of the relay.

In these methods, the relay is configured so that, when a primary side of the relay is open, or not complete, the normally-closed contacts are energized, and the one load is powered by one of the first and the second power source; and when the primary side of the relay is triggered, or closed, the normally-open contacts are energized, and the one load is powered by the other of the first and the second power source. In these embodiments, the relay can be a double pole, double throw relay.

In other embodiments, these methods could further comprise the step of connecting the primary side of the relay to a triggering device. In these embodiments, the relay would thereby be configured so that, when the triggering device is in a first mode of operation the primary side of the relay is open, or not complete, the normally-closed contacts are energized, and the one load is powered by one of the first and the second power source; and when the triggering device is in a second mode of operation the primary side of the relay is triggered, or closed, the normally-open contacts are energized, and the one load is powered by the other of the first and the second power source.

In further embodiments, these methods could be directed to providing power to a packaged terminal unit that provides both heating and cooling to an individual housing unit from one of two power sources, where selection of the of one or the other of the two power sources is determined by mode of operation. In these embodiments, the first power source could be a facility power source or breaker panel; the second power source could be an individual unit power source or breaker panel; the one load could be the packaged terminal unit providing both heating and cooling to the individual unit; and the triggering device could be a thermostat.

In these embodiments, the relay could thereby be configured so that, when the thermostat is in one of a heating or cooling mode the primary side of the relay is open, or not complete, the normally-closed contacts are energized, and the packaged terminal unit is powered by one of the facility power source or the individual unit power source. And, when the thermostat is in the other of the heating or cooling mode the primary side of the relay is triggered, or closed, the normally-open contacts are energized, and the packaged terminal unit is powered by the other of the facility power source or the individual unit power source.

Lastly, in these further embodiments, two lines of the facility power source could be connected to the normally-closed contacts of the secondary side of the relay; and two lines of the individual unit power source could be connected to the normally-open contacts of the secondary side of the relay. Here, the relay would be configured so that, when the thermostat is in a heating mode the primary side of the relay is open, or not complete, the normally-closed contacts are energized, and the packaged terminal unit is powered by facility power source or breaker panel. And, when the thermostat is in a cooling mode the primary side of the relay is triggered, or closed, the normally-open contacts are energized, and the packaged terminal unit is powered by the individual housing unit power source breaker panel.

In other certain embodiments of the disclosure, electrical system arrangements are disclosed to provide power to a single load from one of two power sources. Here, the system includes a relay, where two lines of a first power source are connected to either normally-closed or normally-open contacts of a secondary side of the relay; two lines of a second power source are connected to the other of the normally-closed or the normally-open contacts of the secondary side of the relay; and two lines of the single load are connected to common contacts of the secondary side of the relay.

In these embodiments, the relay is configured so that, when a primary side of the relay is open, or not complete, the normally-closed contacts are energized, and the one load is powered by one of the first and the second power source; and when the primary side of the relay is triggered, or closed, the normally-open contacts are energized, and the single load is powered by the other of the first and the second power source. In these embodiments, the relay can be a double pole, double throw relay.

In other embodiments, these systems could further comprise two lines of a triggering device connected to a primary side of the relay. In these embodiments, the relay would thereby be configured so that, when the triggering device is in a first mode the primary side of the relay is open, or not complete, the normally-closed contacts are energized, and the single load is powered by one of the first and the second power source; and when the triggering device is in a second mode the primary side of the relay is triggered, or closed, the normally-open contacts are energized, and the single load is powered by the other of the first and the second power source.

In further embodiments, these systems could be directed to providing power to a packaged terminal unit that provides both heating and cooling to an individual housing unit from one of two power sources, where selection of the one or the other of the two power sources is determined by mode of operation. In these embodiments, the first power source could be a facility power source or breaker panel; the second power source could be an individual housing unit power source or breaker panel; the single load could be the packaged terminal unit providing both heating and cooling to the individual unit; and the triggering device could be a thermostat.

In these embodiments, the relay could thereby be configured so that, when the thermostat is in one of a heating or cooling mode the primary side of the relay is open, or not complete, the normally-closed contacts are energized, and the packaged terminal unit is powered by one of the facility power source or the individual unit power source. And, when the thermostat is in the other of the heating or cooling mode the primary side of the relay is triggered, or closed, the normally-open contacts are energized, and the packaged terminal unit is powered by the other of the facility power source or the individual unit power source.

Lastly, in these further embodiments, two lines of the facility power source could be connected to the normally-closed contacts of the secondary side of the relay; and two lines of the individual unit power source could be connected to the normally-open contacts of the secondary side of the relay. Here, the relay would be configured so that, when the thermostat is in a heating mode the primary side of the relay is open, or not complete, the normally-closed contacts are energized, and the packaged terminal unit is powered by facility power source or breaker panel. And, when the thermostat is in a cooling mode the primary side of the relay is triggered, or closed, the normally-open contacts are energized, and the packaged terminal unit is powered by the individual housing unit power source breaker panel.

BRIEF DESCRIPTION OF THE ILLUSTRATED EMBODIMENTS

Figure 2:
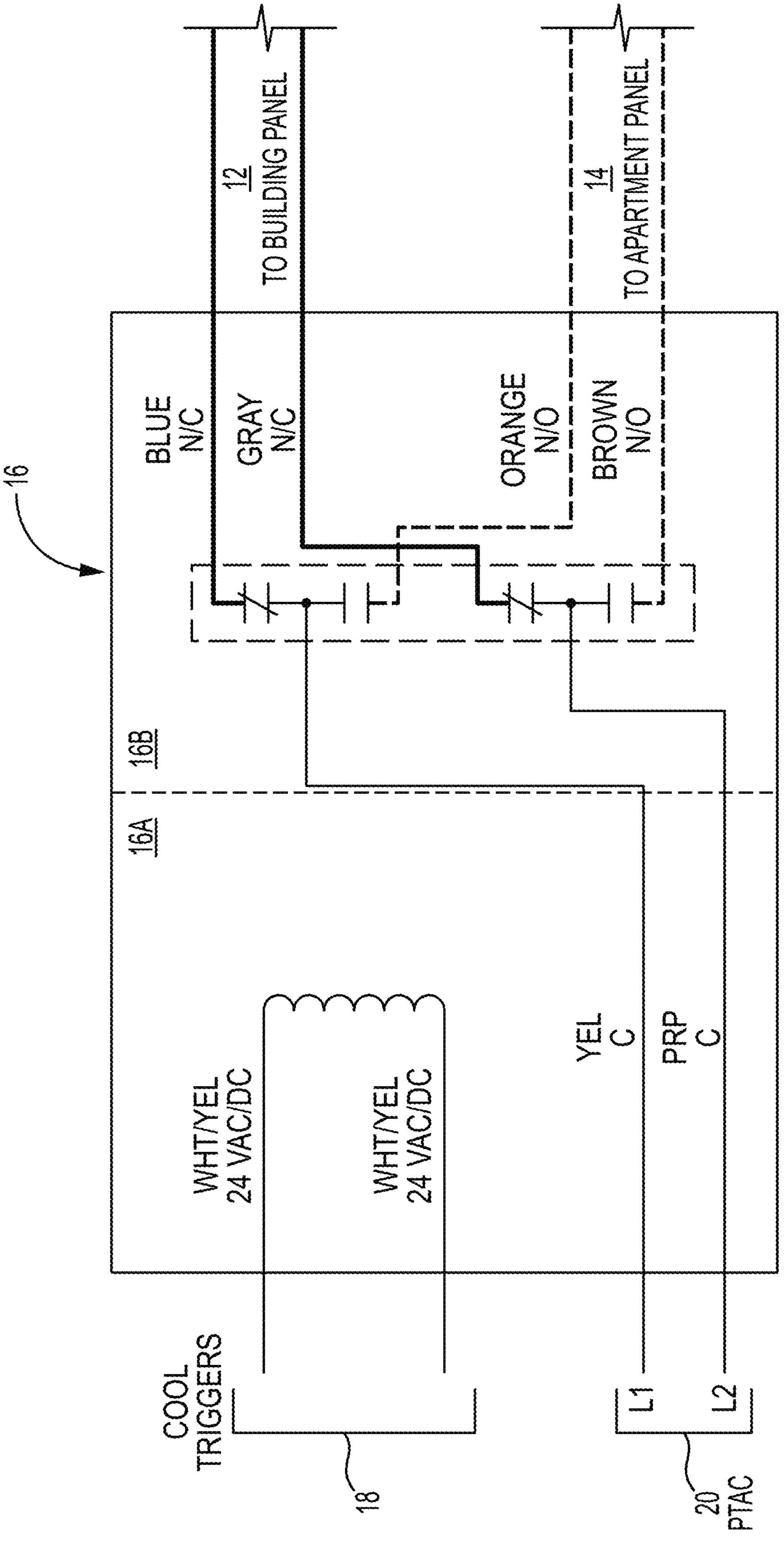

The present invention will be better understood with reference to the following description taken in combination with the drawings. For the purpose of illustration, there are shown in the drawings certain embodiments of the present invention. In the drawings, like numerals indicate like elements throughout. It should be understood, however, that the invention is not limited to the precise arrangements, dimensions, and instruments shown:

FIG. 1 is a diagram illustrating a dual power source installation wired to serve (power) a single packaged terminal unit providing both heating and cooling, where power source is determined based upon heating or cooling mode setting, in accordance with an embodiment of this disclosure; and FIG. 2 is a diagram illustrating relay circuit wiring to facilitate dual power source capability, serving a single packaged terminal unit providing both heating and cooling, where power source selection is triggered by a heating or cooling mode thermostat setting, in accordance with an embodiment of this disclosure.

DETAILED DESCRIPTION OF THE ILLUSTRATED EMBODIMENTS

It is to be understood that the figures and descriptions of the present invention may have been simplified to illustrate elements that are relevant for a clear understanding of the present invention, while eliminating, for purposes of clarity, other elements found in a typical relay or other system elements. Those of ordinary skill in the art will recognize that other elements may be desirable and/or required in order to implement the present invention. However, because such elements are well known in the art, and because they do not facilitate a better understanding of the present invention, a discussion of such elements is not provided herein. It is also to be understood that the drawings included herewith only provide diagrammatic representations of the presently preferred structures of the present invention and that structures falling within the scope of the present invention may include structures different than those shown in the drawings. Reference will be made to the drawings wherein like structures are provided with like reference designations.

Before explaining at least one embodiment in detail, it should be understood that the inventive concepts set forth herein are not limited in their application to the construction details or component arrangements set forth in the following description or illustrated in the drawings. It should also be understood that the phraseology and terminology employed herein are merely for descriptive purposes and should not be considered limiting.

It should further be understood that any one of the described features may be used separately or in combination with other features. Other invented devices, systems, methods, features, and advantages will be or become apparent to one with skill in the art upon examining the drawings and the detailed description herein. It is intended that all such additional devices, systems, methods, features, and advantages be protected by the accompanying claims.

For purposes of this disclosure, the terms "packaged terminal unit" is understood to mean any type of self-contained heating and air-conditioning system, usually mounted through a wall. Examples are a "packaged terminal air conditioner," or "PTAC," and/or a "packaged terminal heat pump," or "PTHP." For purposes of this disclosure, the terms "packaged terminal unit," "packaged terminal air conditioner," "PTAC," "packaged terminal heat pump," and "PTHP," may be used interchangeably.

A goal of this disclosure is to teach a system and method of providing and/or operating a single packaged terminal unit (e.g., a PTAC-packaged terminal air conditioner; or a PTHP-packaged terminal heat pump) that provides both heating and cooling to a housing unit, by one or the other of two power sources. The selection of whether the one or the other of the two power sources is used can be determined by whether the packaged terminal unit is providing heating or cooling to the housing unit.

Therefore, among other teachings, the present disclosure provides a method of wiring a relay to control one load from one or the other of two power sources. In one aspect, wiring of the relay could be configured to power the one load from a first power source when operating in a default, or normally-closed condition, and power the one load from a second power source when operating in a triggered, or normally-open condition (where normally open contacts are now closed and energized).

In an aspect where the one load is a packaged terminal unit, the wiring of the relay could be configured to power the packaged terminal unit, when providing heat to an individual housing unit, from a power source (breaker panel) of an overall facility (wherein the individual housing unit is a part). The heating mode of the packaged terminal unit, as possibly instructed to a primary side of the relay by a thermostat, could be the default, or normally-closed condition of the relay (where normally-closed contacts are wired to, and energized by, the facility power source. The cooling mode of the packaged terminal unit, as instructed by the thermostat, could be the triggered, or normally-open condition of the relay, where a thermostat setting to a cooling mode triggers the normally-open contacts closed, and the packaged terminal unit is then wired to, and energized by, the individual housing unit power source. Naturally, wiring of the normally-closed and normally-open contacts could be reversed, and other element wiring altered, to effectuate the same result; that is, to have the packaged terminal unit powered by the individual housing unit power source when in the cooling mode, and powered by the facility power source when in the heating mode, where a thermostat setting of heating or cooling triggers the relay switching between the overall facility power source and the individual unit power source.

FIG. 1 illustrates one embodiment of a system 10 for providing and/or operating a single packaged terminal unit that provides both heating and cooling to an individual housing unit (e.g., apartment or condo), by one or the other of two power sources. FIG. 1 shows a first power source 12, a second power source 14, a relay 16, a thermostat 18, and a packaged terminal unit 20 (or outlet for the packaged terminal unit 20).

In this embodiment, the first power source 12 is an overall facility (e.g., building or complex) power source or circuit breaker panel. The second power source 14 is an individual housing unit overall facility (e.g., apartment or condo) power source or circuit breaker panel. In conjunction with the above identified power sources, FIG. 1 also illustrates a facility or building power supply line 22 and an individual housing unit or apartment power supply line 24. The respective supply lines 22, 24 are tied into a junction box 26 for efficient and properly spaced interconnection to the relay 16, before ultimately feeding the packaged terminal unit 20.

The relay 16 could be any commercially available relay of proper primary or coil voltage, and of a properly sized secondary voltage and current to adequately serve the needs of the packaged terminal unit 20. In a certain embodiment, a RIB® relay is used (more specifically, a RIB24P30 relay) by Functional Devices, Inc.®. Here, the relay 16 is a DPDT (Double Pole, Double Throw) type relay, of 24*v* primary coil current and 30 amp secondary current at 300*v*.

In FIG. 1, the relay 16 is internally wired so that two lines of the facility or building power supply line 22 are connected to either normally-closed or normally-open contacts of a secondary side of the relay 16; two lines of the individual housing unit or apartment power supply line 24 are connected to the other of the normally-closed or the normally-open contacts of the secondary side of the relay 16; and two lines of the packaged terminal unit 20 are connected to common contacts of the secondary side of the relay 16. From the thermostat 18, a mode (heating or cooling) control wiring is connected to a primary side of the relay 16.

In the FIG. 1 embodiment, the relay 16 wiring is configured so that, when a primary side of the relay is open, or not complete, the normally-closed contacts are energized, and the packaged terminal unit 20 is powered by one of the first and the second power source; and when the primary side of the relay is triggered, closed, or complete, the normally-open contacts are energized, and the packaged terminal unit 20 is powered by the other of the first and the second power source.

In a more specific FIG. 1 embodiment, the relay 16 wiring is configured so that, when the thermostat 18 signals heating mode to the primary side of the relay 16, the packaged terminal unit 20 is powered by the facility or building power source 12; and when the thermostat 18 signals cooling mode to the primary side of the relay 16, the packaged terminal unit 20 is powered by the individual housing unit or apartment power source 14.

FIG. 2 illustrates one embodiment of an internal wiring of (or a method of wiring) a relay 16 for providing and/or operating a single packaged terminal unit 20 (providing both heating and cooling to an individual housing unit) by one or the other of the two power sources.

In the FIG. 2 embodiment, the thermostat 18 is connected to a coil, or primary side 16A of the relay 16. From the thermostat 18, a mode (heating or cooling) is signaled to the primary side 16A of the relay 16. Two lines of the facility or building power source 12 are connected to normally-closed NC contacts of a secondary side 16B of the relay 16. Two lines of the individual housing unit power source 14 are connected to normally-open NO contacts of the secondary side 16B of the relay 16. Two lines L1, L2 of the packaged terminal unit 20 are connected to common contacts C of the secondary side 16B of the relay 16.

In the FIG. 2 embodiment, when the thermostat 18 is in a heating mode, the primary side 16A of the relay is open, or not complete, and the normally-closed NC contacts are energized, thereby energizing the packaged terminal unit 20 from the facility power source or breaker panel 12. When the thermostat 18 is in a cooling mode, the primary side 16A of the relay 16 is triggered, or closed, the normally-open NO contacts are energized, thereby energizing the packaged terminal unit 20 from the individual unit power source or breaker panel 14.

As may be readily understood, wiring of the normally-closed NC and normally-open NO contacts could be reversed, with relay 16 triggering when in a heating mode. Further, other element wiring could be altered to effectuate the same result (i.e., to have the packaged terminal unit 20 powered by the individual housing unit power source 14 when in a cooling mode, and powered by the facility power source 12 when in a heating mode, where a thermostat mode setting of heating or cooling triggers the relay switching between the overall facility power source 12 and the individual unit power source 14.

In certain situations, or particular need, one may desire that the packaged terminal unit 20 be powered by the individual housing unit power source 14 (or other source) when in a heating mode, and powered by the facility power source 12 (or other source) when in a cooling mode, where a thermostat mode setting of heating or cooling (or particular temperature setting) triggers the relay 16 switching between the overall facility power source 12 (or other source) and the individual unit power source 14 (or other source). Certain variations or permutations might be envisioned from this disclosure. Such alternatives are considered to be within the spirit and scope of the present disclosure, and may therefore utilize the advantages of the configurations and embodiments described above.

In further situations, or particular need, the thermostat could be substituted by another type of triggering device to provide a control signal to the primary side of the relay. Alternative triggering devices are readily known, and could include manual or remotely controlled switches and/or various sensors. In either event, whether the single load is powered by the first or the second power source could be determined by a mode (or state) of the triggering device selected. One could also envision selection of a power source from more than two power source alternatives.

The method steps in any of the embodiments described herein are not restricted to being performed in any particular order. Also, structures mentioned in any of the method embodiments may utilize structures mentioned in any of the device embodiments. Such structures may be described in detail with respect to the device embodiments only but are applicable to any of the method embodiments.

Features in any of the embodiments described in this disclosure may be employed in combination with features in other embodiments described herein, such combinations are considered to be within the spirit and scope of the present invention.

The contemplated modifications and variations specifically mentioned in this disclosure are considered to be within the spirit and scope of the present invention.

More generally, even though the present disclosure and exemplary embodiments are described above with reference to the examples according to the accompanying drawings, it is to be understood that they are not restricted thereto. Rather, it is apparent to those skilled in the art that the disclosed embodiments can be modified in many ways without departing from the scope of the disclosure herein. Moreover, the terms and descriptions used herein are set forth by way of illustration only and are not meant as limitations. Those skilled in the art will recognize that many variations are possible within the spirit and scope of the disclosure as defined in the following claims, and their equivalents, in which all terms are to be understood in their broadest possible sense unless otherwise indicated.

What is claimed is:

1. A method of operating a packaged terminal unit that provides both heating and cooling to an individual housing unit from either the individual housing unit power source or from a facility power source, wherein selection of either power source is determined by mode of operation of a thermostat, the method comprising the steps of:

providing a double pole, double throw relay; the relay having primary and secondary sides, the secondary sides having two normally-closed contacts, two normally-open contacts, and two common contacts;

connecting two lines of the facility power source to the normally-closed contacts of the secondary side of the relay;

connecting two lines of the individual unit power source to the normally-open contacts of the secondary side of the relay;

connecting two lines of the packaged terminal unit to the common contacts of the secondary side of the relay; and connecting two lines of the thermostat to the primary side of the contacts; wherein the thermostat is configured to signal mode of operation to the primary side of the relay;

wherein the relay is configured so that:

when the thermostat is in a heating mode the primary side of the relay is open, or not complete, the normally-closed contacts are energized, and the packaged terminal unit is powered by facility power source or breaker panel; and when the thermostat is in a cooling mode the primary side of the relay is triggered, or closed, the normally-open contacts are energized, and the packaged terminal unit is powered by the individual housing unit power source breaker panel.

2. A method of wiring a relay to control one load from two power sources, the method comprising the steps of:

connecting two lines of a first power source to either normally-closed or normally-open contacts of a secondary side of the relay;

connecting two lines of a second power source to the other of the normally-closed or the normally-open contacts of the secondary side of the relay;

connecting two lines of the one load to common contacts of the secondary side of the relay; and connecting a primary side of the relay to a triggering device;

wherein:

the method is directed to providing power to a packaged terminal unit that provides both heating and cooling to an individual housing unit from one of the two power sources;

selection of the one or the other of the two power sources is determined by mode of operation of the triggering device;

the first power source is a facility power source or breaker panel;

the second power source is an individual housing unit power source or breaker panel;

the one load is the packaged terminal unit providing both heating and cooling to the individual housing unit;

the triggering device is a thermostat; and the relay is configured so that, when the thermostat is in one of a heating or cooling mode the primary side of the relay is open, or not complete, the normally-closed contacts are energized, and the packaged terminal unit is powered by one of the facility power source or the individual unit power source; and when the thermostat is in the other of the heating or cooling mode the primary side of the relay is triggered, or closed, the normally-open contacts are energized, and the packaged terminal unit is powered by the other of the facility power source or the individual housing unit power source.

3. The method of claim 2, wherein the relay is a double pole, double throw relay.

4. The method of claim 2, wherein:

two lines of the facility power source are connected to the normally-closed contacts of the secondary side of the relay; and two lines of the individual unit power source are connected to the normally-open contacts of the secondary side of the relay;

wherein the relay is configured so that:

when the thermostat is in a heating mode the primary side of the relay is open, or not complete, the normally-closed contacts are energized, and the packaged terminal unit is powered by facility power source or breaker panel; and when the thermostat is in a cooling mode the primary side of the relay is triggered, or closed, the normally-open contacts are energized, and the packaged terminal unit is powered by the individual housing unit power source breaker panel.

5. A method of operating a single load powered from one of two power sources, the method comprising the steps of:

connecting two lines of a first power source to either normally-closed or normally-open contacts of a secondary side of the relay;

connecting two lines of a second power source to the other of the normally-closed or the normally-open contacts of the secondary side of the relay;

connecting two lines of the single load to common contacts of the secondary side of the relay; and connecting a primary side of the relay to a triggering device;

wherein:

the method is directed to providing power to a packaged terminal unit that provides both heating and cooling to an individual housing unit from one of the two power sources;

selection of the one or the other of the two power sources is determined by mode of operation of the triggering device;

the first power source is a facility power source or breaker panel;

the second power source is an individual housing unit power source or breaker panel;

the single load is the packaged terminal unit providing both heating and cooling to the individual housing unit;

the triggering device is a thermostat; and the relay is configured so that, when the thermostat is in one of a heating or cooling mode the primary side of the relay is open, or not complete, the normally-closed contacts are energized, and the packaged terminal unit is powered by one of the facility power source or the individual unit power source; and when the thermostat is in the other of the heating or cooling mode the primary side of the relay is triggered, or closed, the normally-open contacts are energized, and the packaged terminal unit is powered by the other of the facility power source or the individual housing unit power source.

6. The method of claim 5, wherein:

two lines of the facility power source are connected to the normally-closed contacts of the secondary side of the relay; and two lines of the individual unit power source are connected to the normally-open contacts of the secondary side of the relay;

wherein the relay is configured so that:

when the thermostat is in a heating mode the primary side of the relay is open, or not complete, the normally-closed contacts are energized, and the packaged terminal unit is powered by facility power source or breaker panel; and when the thermostat is in a cooling mode the primary side of the relay is triggered, or closed, the normally-open contacts are energized, and the packaged terminal unit is powered by the individual housing unit power source breaker panel.

7. The method of claim 5, wherein the relay is a double pole, double throw relay.

8. A electrical system arrangement to provide power to a single load from one of two power sources, the system comprising:

a relay, wherein:

two lines of a first power source are connected to either normally-closed or normally-open contacts of a secondary side of the relay;

two lines of a second power source are connected to the other of the normally-closed or the normally-open contacts of the secondary side of the relay;

two lines of the single load are connected to common contacts of the secondary side of the relay; and a triggering device is connected to a primary side of the relay;

wherein:

the system is arranged to provide power to a packaged terminal unit that provides both heating and cooling to an individual housing unit from one of the two power sources;

selection of the one or the other of the two power sources is determined by mode of operation of the triggering device;

the first power source is a facility power source or breaker panel;

the second power source is an individual housing unit power source or breaker panel;

the single load is the packaged terminal unit providing both heating and cooling to the individual housing unit;

the triggering device is a thermostat; and the relay is configured so that, when the thermostat is in one of a heating or cooling mode the primary side of the relay is open, or not complete, the normally-closed contacts are energized, and the packaged terminal unit is powered by one of the facility power source or the individual unit power source; and when the thermostat is in the other of the heating or cooling mode the primary side of the relay is triggered, or closed, the normally-open contacts are energized, and the packaged terminal unit is powered by the other of the facility power source or the individual housing unit power source.

9. The system of claim 8 wherein the relay is a double pole, double throw relay.

10. The system of claim 8, wherein:

two lines of the facility power source are connected to the normally-closed contacts of the secondary side of the relay; and two lines of the individual unit power source are connected to the normally-open contacts of the secondary side of the relay;

wherein the relay is configured so that:

when the thermostat is in a heating mode the primary side of the relay is open, or not complete, the normally-closed contacts are energized, and the packaged terminal unit is powered by facility power source or breaker panel; and when the thermostat is in a cooling mode the primary side of the relay is triggered, or closed, the normally-open contacts are energized, and the packaged terminal unit is powered by the individual housing unit power source breaker panel.

* * * * *